United States Patent
Duffin

(10) Patent No.: US 10,322,736 B1
(45) Date of Patent: Jun. 18, 2019

(54) WHEELBARROW FIXER BRACKET ASSEMBLY

(71) Applicant: Brian Duffin, Danville, NH (US)

(72) Inventor: Brian Duffin, Danville, NH (US)

(*) Notice: Subject to any disclaimer, the term of this patent is extended or adjusted under 35 U.S.C. 154(b) by 0 days.

(21) Appl. No.: 15/985,078

(22) Filed: May 21, 2018

(51) Int. Cl.
*B62B 1/18* (2006.01)

(52) U.S. Cl.
CPC ............ *B62B 1/18* (2013.01); *B62B 2301/05* (2013.01); *B62B 2501/00* (2013.01)

(58) Field of Classification Search
None
See application file for complete search history.

(56) References Cited

U.S. PATENT DOCUMENTS

| | | | |
|---|---|---|---|
| 355,245 A * | 12/1886 | Annin | |
| 1,965,409 A | 7/1934 | Forrer | |
| D349,797 S | 8/1994 | Daughtery | |
| 5,884,924 A * | 3/1999 | Fairchild | B62B 1/18 280/47.31 |
| 6,099,025 A | 8/2000 | Rohrs | |
| 6,755,478 B2 * | 6/2004 | Messinger-Rapport | B62B 1/24 280/47.31 |
| 7,866,686 B2 * | 1/2011 | Conaway | B62B 1/208 280/47.31 |
| 9,090,273 B2 | 7/2015 | Albert et al. | |
| 2004/0188965 A1 * | 9/2004 | Feick | B62B 1/18 280/47.131 |
| 2010/0201091 A1 * | 8/2010 | Easterling | B62B 1/20 280/47.31 |
| 2011/0109055 A1 * | 5/2011 | Tol | B62B 1/22 280/47.31 |
| 2012/0049473 A1 | 3/2012 | Robinson | |
| 2014/0231164 A1 * | 8/2014 | Michel, Jr. | B62B 1/18 180/218 |
| 2014/0367934 A1 | 12/2014 | Ludlow | |
| 2015/0027794 A1 * | 1/2015 | Vandelinde | B62B 5/0066 180/19.1 |
| 2015/0329131 A1 | 11/2015 | Dumas | |
| 2017/0225700 A1 * | 8/2017 | Snyder | B62B 1/18 |

* cited by examiner

*Primary Examiner* — Paul N Dickson
*Assistant Examiner* — Hilary L Johns

(57) ABSTRACT

A wheelbarrow bracket assembly for improving the performance of a wheelbarrow includes a wheelbarrow that has a bucket, a pair of handles, a pair of supports each extending between a respective one of the handles and the bucket, and a wheel that is rotatably coupled between the handles. A bracket is coupled between each of the supports. The bracket inhibits each of the handles from moving laterally away from the wheel. Thus, a nose piece that extends between the handles may be removed from the wheelbarrow. In this way the wheelbarrow may be rolled along the ground without having the nose piece engaging the ground and tipping the wheelbarrow.

1 Claim, 4 Drawing Sheets

WHEELBARROW FIXER BRACKET ASSEMBLY

CROSS-REFERENCE TO RELATED APPLICATIONS

Statement Regarding Federally Sponsored Research or Development

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to bracket devices and more particularly pertains to a new bracket device for improving the performance of a wheelbarrow.

BRIEF SUMMARY OF THE INVENTION

An embodiment of the disclosure meets the needs presented above by generally comprising a wheelbarrow that has a bucket, a pair of handles, a pair of supports each extending between a respective one of the handles and the bucket, and a wheel that is rotatably coupled between the handles. A bracket is coupled between each of the supports. The bracket inhibits each of the handles from moving laterally away from the wheel. Thus, a nose piece that extends between the handles may be removed from the wheelbarrow. In this way the wheelbarrow may be rolled along the ground without having the nose piece engaging the ground and tipping the wheelbarrow.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
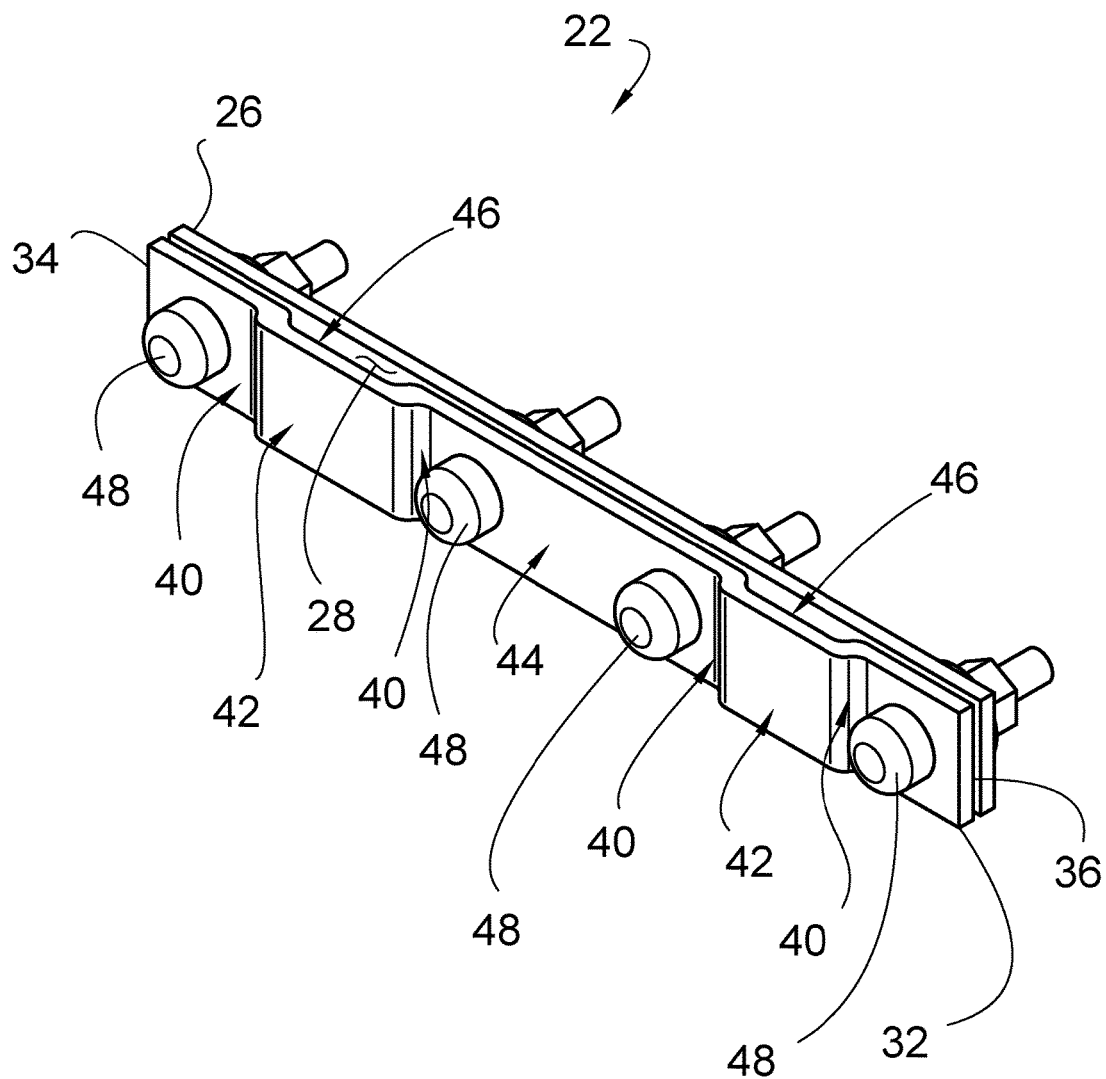
FIG. 1 is a perspective view of a bracket of a wheelbarrow bracket assembly according to an embodiment of the disclosure.
Figure 2:
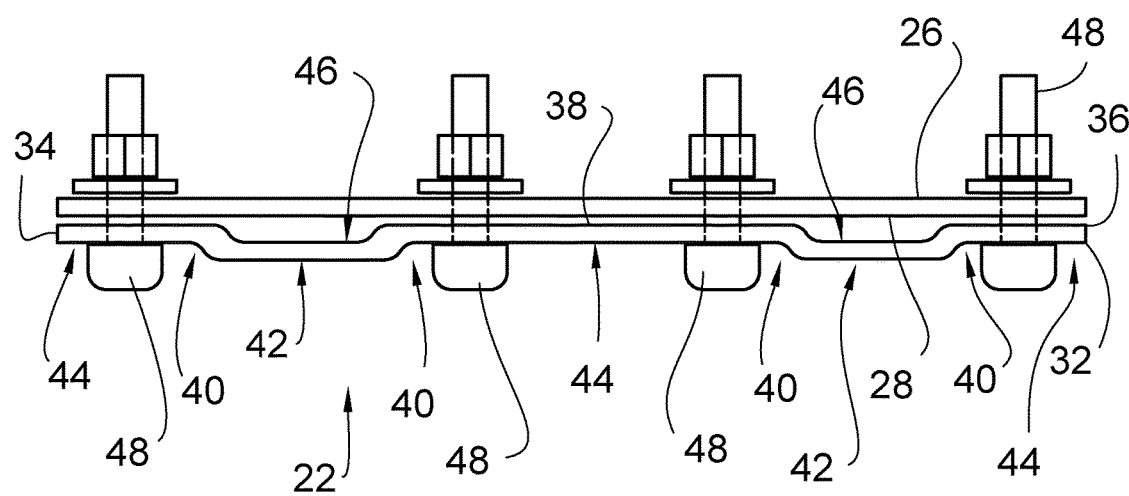
FIG. 2 is a top phantom view of a bracket of an embodiment of the disclosure.
Figure 3:
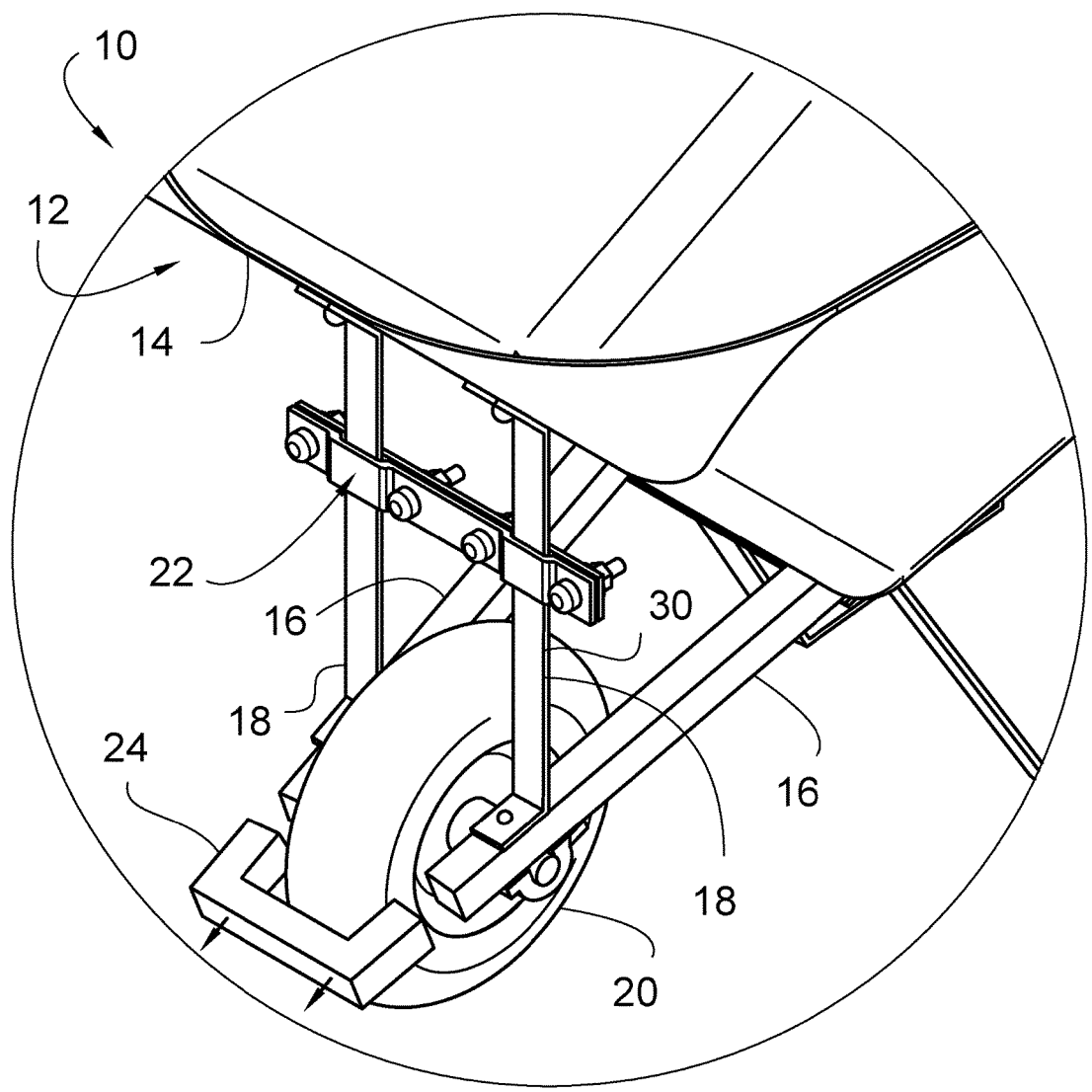
FIG. 3 is a perspective in-use view of an embodiment of the disclosure.

With reference now to the drawings, and in particular to FIGS. 1 through 4 thereof, a new bracket device embodying the principles and concepts of an embodiment of the disclosure and generally designated by the reference numeral 10 will be described.

As best illustrated in FIGS. 1 through 4, the wheelbarrow bracket assembly 10 generally comprises a wheelbarrow 12 that has a bucket 14, a pair of handles 16 and a pair of supports 18 that extend between a respective one of the handles 16 and the bucket 14. Additionally, the wheelbarrow 12 includes a wheel 20 that is rotatably coupled between the handles 16 and each of the supports 18 is aligned with the wheel 20. The wheelbarrow 12 may be a single wheeled wheelbarrow 12 of any conventional design.

A bracket 22 is coupled between each of the supports 18 and the bracket 22 inhibits each of the handles 16 from moving laterally away from the wheel 20. The bracket 22 facilitates a nose piece 24 that extends between the handles 16, in front of the wheel 20, on conventional wheelbarrows to be removed. Thus, the wheelbarrow 12 may be rolled along the ground without the risk of the nose piece 24 engaging the ground and tipping the wheelbarrow 12. In this way the function of conventional wheelbarrows is improved with the addition of the bracket 22 and the removal of the nose piece 24. Alternatively, the wheelbarrow 12 may be manufactured with the bracket 22 in place of the nose piece 24.

The bracket 22 comprises a first member 26 that has a first surface 28. The first member 26 extends between each of the supports 18 having the first surface 28 abutting a back side 30 of the supports 18. Moreover, the first member 26 is horizontally oriented and is positioned between the wheel 20 and the bucket 14. The first member 26 is comprised of a rigid material such as steel or the like.

The bracket 22 includes a second member 32 that has a primary end 34, a secondary end 36 and a primary surface 38 extending therebetween. The second member 32 has a plurality of bends 40 thereon and the bends 40 are spaced apart from each other and are distributed between the primary end 34 and the secondary end 36. Moreover, the bends 40 define a pair of first portions 42 of the second member 32 that is each offset with respect to a plurality of second portions 44 of the second member 32. Each of the first portions 42 defines a pair of recesses 46 on the primary surface 38.

The primary surface 38 of the second member 32 abuts the first surface 28 of the first member 26 having each of the supports 18 being positioned in a respective one of the recesses 46. In this way each of the supports 18 is laterally restrained on the second member 32. A plurality of fasteners 48 is provided and each of the fasteners 48 extends through the first member 26 and engages the second member 32. Each of the fasteners 48 compresses the first member 26 and the second member 32 on the supports 18 thereby retaining the bracket 22 on the supports 18. Each of the fasteners 48 may comprise a nut and a bolt or other similar, releasable fastener.

Figure 4:
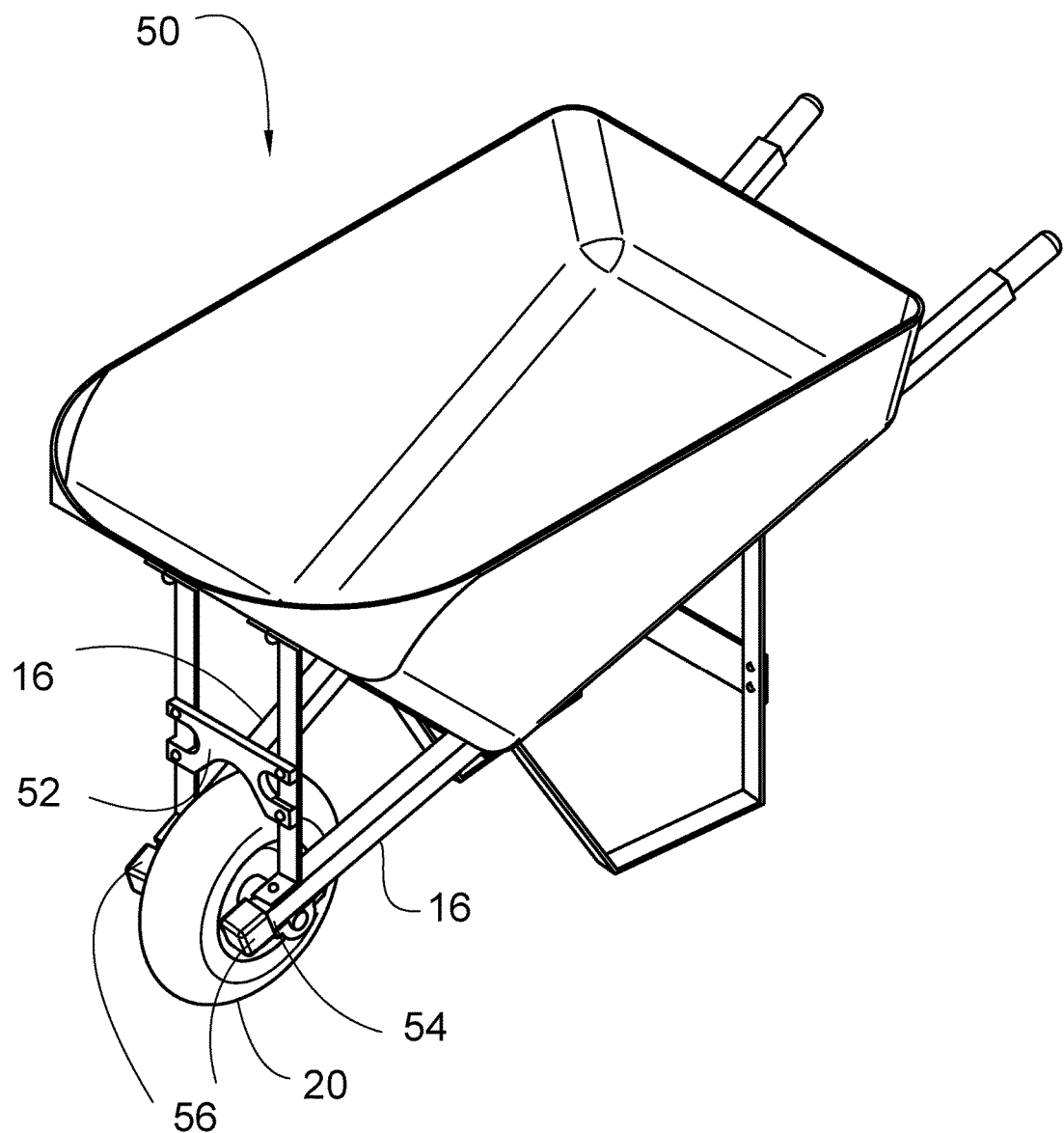
FIG. 4 is a perspective view of an alternative embodiment of the disclosure.

In an alternative embodiment 50 as shown in FIG. 4, a panel 52 may be provided and the panel 52 may be attached between each of the supports 18. Each of the handles 16 may have a first end 54 and the wheel 20 may be aligned with the first end 54 of each of the handles 16. A pair of end caps 56 may be provided and each of the end caps 56 may be positioned on the first end 54 of a respective one of the handles 16. Each of the end caps 56 may be comprised of a resiliently compressible material such as rubber or the like.

In use, the nosepiece 24 on the wheelbarrow 12 is removed from the handles 16 and each of the handles 16 is cut such that each of the handles 16 terminates at a point that is aligned with a leading edge of the wheel 20. The first member 26 is positioned to extend between the supports 18 and abut the back side 30 of the supports 18. The second member 32 is positioned a front side 58 of the supports 18 such that each of the supports 18 is positioned in a respective one of the recesses 46 on the second member 32. The fasteners 48 are extended through the first 26 and second 32 members thereby retaining each of the first 26 and second 32 members on the supports 18. Removing the nose piece 24 and shortening the handles 16 eliminates the risk of the nose piece 24 or the handles 16 from engaging the ground when the wheelbarrow 12 is rolled along the ground. In this way the wheelbarrow 12 is inhibited from nose diving or tipping over resulting from the nose piece 24 or the handles 16 engaging the ground.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A wheelbarrow bracket assembly for eliminating a nose piece in front of a wheel on a wheelbarrow, said assembly comprising:

a wheelbarrow having a bucket, a pair of handles, a pair of supports each extending between a respective one of said handles and said bucket, and a wheel being rotatably coupled between said handles, each of said supports having a back side; and a bracket being coupled between each of said supports, said bracket inhibiting each of said handles from moving laterally away from said wheel thereby facilitating a nose piece extending between said handles to be removed wherein said wheelbarrow is configured to be rolled along the ground without having said nose piece engaging the ground and tipping said wheelbarrow, said bracket comprising:

a first member having a first surface, said first member extending between each of said supports having said first surface abutting said back side of said supports, said first member being horizontally oriented and being positioned between said wheel and said bucket;

a second member having a primary end, a secondary end and a primary surface extending therebetween, said second member having a plurality of bends thereon, said bends being spaced apart from each other and being distributed between said primary end and said secondary end, said bends defining a pair of first portions of said second member being offset with respect to a plurality of second portions of said second member thereby defining a pair of recesses on said primary surface, said primary surface of said second member abutting said first surface of said first member having each of said supports being positioned in a respective one of said recesses such that each of said supports is laterally restrained on said second member; and a plurality of fasteners, each of said fasteners extending through said first member and engaging said second member to compress each of said first member and said second member on said supports.

* * * * *